United States Patent [19]

Russo et al.

[11] Patent Number: 5,765,113
[45] Date of Patent: Jun. 9, 1998

[54] METHOD AND APPARATUS FOR AVOIDING DESENSITIZATION OF A RADIO FREQUENCY RECEIVER

[76] Inventors: David William Russo, 2301 Dorman Drive, Burnaby, B.C., Canada, V5A 2V3; Thomas Wayne Lockhart, 9400 Ryan Crescent, Richmond, B.C., Canada, V7A 2H2; Geoffrey Richard Scotton, 11301 Makak Rd., Woodway, Wash. 98020; Andrew Scott Lundholm, 106 W. Bittersweet La., Streamwood, Ill. 60107; Donald Edmund Koss, 240 Foxmoor Rd., Fox River Grove, Ill. 60021

[21] Appl. No.: 366,159

[22] Filed: Dec. 29, 1994

[51] Int. Cl.$^6$ ................................................ H04B 1/10
[52] U.S. Cl. ........................ 455/557; 455/574; 455/296; 455/310; 455/344
[58] Field of Search ........................ 455/63, 67.1, 67.3, 455/296, 298, 310, 344, 423, 425, 556, 557, 558, 574, 254, 343, 575, 66, 74; 395/750.05, 750.06, 750.03

[56] References Cited

U.S. PATENT DOCUMENTS 4,879,758  11/1989  DeLuca et al. .
5,008,955   4/1991  Sato ................................. 455/310
5,142,699   8/1992  Sato et al. .
5,430,894   7/1995  Nohara et al. .
5,437,060   7/1995  Delamater et al. ............... 455/310
5,471,660  11/1995  Masaki .
5,471,663  11/1995  Davis .
5,604,928   2/1997  Hamano et al. ................... 455/310
5,630,224   5/1997  Swail ............................... 455/296

*Primary Examiner*—Reinhard J. Eisenzopf
*Assistant Examiner*—Lester G. Kincaid
*Attorney, Agent, or Firm*—J. Ray Wood

[57] ABSTRACT

A subscriber terminal (104) suitable for operation in a wireless communications system (100) arranged and constructed to provide data communications between the infrastructure (111) and the subscriber terminal, includes a portable computing device (105) operating in a operating state and a radio frequency receiver (201) operatively coupled to the portable computing device, the radio frequency receiver arranged to detect a radio frequency interference corresponding to an operating environment, and to execute a corrective action that corresponds to the radio frequency interference. A corresponding method of avoiding desensitization of the radio frequency receiver includes detecting, at the RF receiver, a radio frequency interference that corresponds to an operating environment to provide an interference indication; determining, responsive to the interference indication, a corrective action for the RF receiver; and executing the corrective action for the RF receiver.

28 Claims, 3 Drawing Sheets

METHOD AND APPARATUS FOR AVOIDING DESENSITIZATION OF A RADIO FREQUENCY RECEIVER

FIELD OF THE INVENTION

The present disclosure deals with communications receivers and more particularly but not limited to a method and apparatus for avoiding desensitization of a radio frequency receiver.

BACKGROUND OF THE INVENTION

Subscriber terminals, such as personal digital assistants and other types of portable computers using data radio transceivers are being used in a wide variety of applications. Such terminals may be used in a variety of circumstances such as requesting stock quotes, accessing data files or a central data processing center or immediate access to time sensitive information like E-mail messages. Examples of such subscriber terminals include various personal digital assistants (PDA) or palmtop computers developed by Motorola, Inc. Subscriber terminals such as these operate in conjunction with wireless telecommunications infrastructure equipment (i.e., the ARDIS infrastructure system operated by Motorola). The wireless infrastructure equipment typically includes stationary transceivers interconnected with a local telephone network or other data network or transfer facility.

Typically, upon receiving a request to transmit, a data transceiver transmits a request to send and then waits for authorization to send before transmitting or sending a data packet. In the case of receiving a data communications, a data transceiver ordinarily includes a call selective receiver for recognizing and receiving only calls directed to the target subscriber terminal.

As with any wireless system a signal directed to a subscriber terminal by way of a wireless data receiver may be blocked by a hill or other tall object that unduly attenuates the signal. Further, at some radio signal levels, noise generated within the computer portion of a subscriber terminal by clocking devices or switching power supplies may result in a signal to noise ratio of such a low level as to render the signal unintelligible. Past efforts directed to reducing the effects of internally generated noise sources, such as desensitization due to interference, have taught that shielding and physical isolation of significant noise sources from the receiver section are a means of improving the signal to noise ratio. However, package size objectives may not allow sufficient isolation and shielding may be otherwise unduly large and economically burdensome.

Because of the importance and wide spread usage of subscriber terminals including portable computers and other portable digital systems a need exists for more effective techniques of suppressing the interference effects or desensitization of radio frequency receivers resulting from the noise generated within such computer like devices.

BRIEF DESCRIPTION OF THE DRAWINGS

The features of the present invention which are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
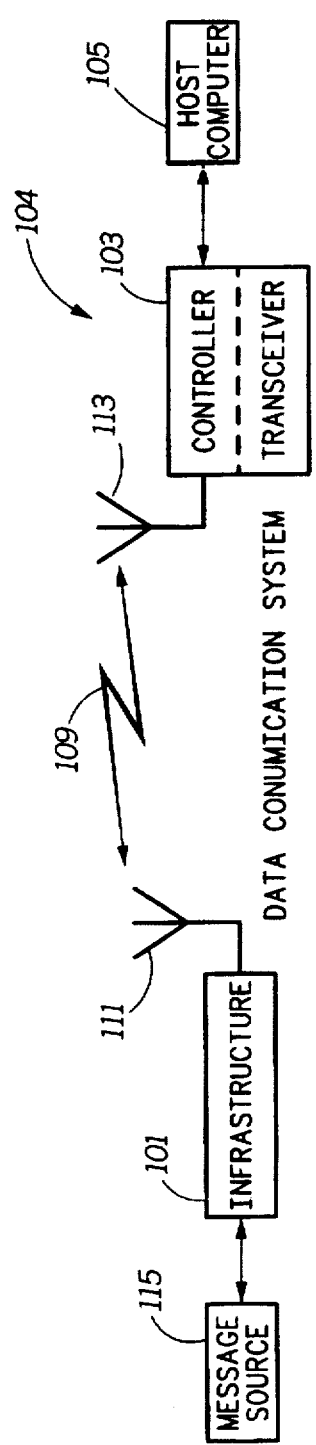
FIG. 1 is a representative diagram of a data communications system suitable for employing embodiments in accordance with the present invention.

Generally the present disclosure deals with techniques for avoiding desensitization of radio frequency receivers and more specifically such receivers that operate, for example, in close proximity or cooperatively with computers such as portable computers for the purposes of providing a subscriber terminal in a wireless communications system such as a wireless data communications system.

A preferred method embodiment is set in a subscriber terminal suitable for operation in a wireless communications system having an infrastructure and such subscriber terminals. The system is arranged and constructed to provide data communications between the infrastructure and the subscriber terminals. The subscriber terminal includes a computer that is operatively coupled to a radio frequency (RF) receiver so as to provide, for example a convenient user interface to the communications system. This method avoids desensitization of the radio frequency receiver due to radio frequency energy generated by the computer and includes providing an operating state for the computer; determining, responsive to this operating state, a corrective action for the RF receiver; and executing the corrective action for the RF receiver.

The step of executing a corrective action may include, for example, a step of delaying a communication with the infrastructure, attempting to establish communications on a different radio frequency, or modifying the attributes, such as data rate or error correction scheme, etc. of the transmission or data link protocol. In either case the step of determining may include a step of conditioning the execution step on a step of assessing an interference indication and comparing the interference indication to a threshold. The execution steps may be foregone when the threshold is satisfied.

An apparatus embodiment is a subscriber terminal suitable for operation on a wireless communications system that is arranged and constructed to provide data communications between an infrastructure and the subscriber terminal. The subscriber terminal includes a portable computing device arranged to provide a signal corresponding to a operating state and a radio frequency receiver arranged to receive communications from the infrastructure and operatively coupled to the portable computing device. The radio frequency receiver, responsive to the signal, further executes a corrective action that avoids desensitization corresponding to the operating state.

The subscriber terminal, preferably, further includes a controller for responding to the signal and providing control for the radio frequency receiver as well as an interference detector, coupled to the controller, for providing an interference indication. The controller may then condition the corrective action on this interference indication. The corrective action, preferably includes delaying a communication with the infrastructure but may include, for example, attempting to establish communications on a different radio frequency or modifying data link attributes.

An alternative method embodiment directed to similar ends and similarly set includes detecting a radio frequency interference at the RF receiver to provide an interference indication; determining, responsive to the interference indication, a corrective action for the computer; and undertaking or executing this corrective action. Executing this corrective action includes alternatively or collectively disabling a power supply, disabling a display, changing a processor clock used by the computer or preferably putting the computer into a sleep state. The computer may be reactivated when the interference indication is no longer present. A subscriber terminal embodiment suitable for operation in accordance with these principles includes a radio frequency receiver operating to receive communications from the infrastructure and to detect a radio frequency interference to provide an interference indication; and a portable computing device operatively coupled to the radio frequency receiver and arranged to execute, responsive to the interference indication, a corrective action that avoids the radio frequency interference.

A further method embodiment includes: detecting, at the RF receiver, a radio frequency interference that corresponds to an operating environment, such as the circumstances associated with a proximately located computer or those present due to noise extraneous to the subscriber terminal such as that caused by or due to an independent computer that may be found, for example, in automotive based controllers, to provide an interference indication; determining, responsive to the interference indication, a corrective action for the RF receiver; and executing the corrective action for the RF receiver. Again the corrective action may include a step of delaying a communication with the infrastructure, attempting to establish communications on a different radio frequency, or modifying data link attributes any or all of which may be conditioned on the interference indication satisfying a threshold.

Similar to above, a subscriber terminal embodying similar, but specific, principles includes a portable computing device operating in a operating state to provide a user interface and a radio frequency receiver operatively coupled to the portable computing device, that is arranged to receive communications from the infrastructure, to detect a radio frequency interference that corresponds to the operating state, and to execute a corrective action that corresponds to the radio frequency interference. Preferably such a subscriber terminal further includes a controller for providing control for the radio frequency receiver and an interference detector, coupled to the controller, for detecting the radio frequency interference to provide an interference indication. Given these, the subscriber terminal may condition the corrective action(s), for various examples see above, on the interference indication.

The instant invention can be more fully described with reference to the figures in which FIG. 1 depicts a data communications system (100). The data communications system (100) includes a message source (115) such as a public switched telephone network, shown coupled to an infrastructure (101) that includes network controllers (not specifically shown). The infrastructure (101) includes a transceiver or base station coupled to an antenna (111) and operating to receive and transmit radio signals over a wireless radio channel (109). The radio signals are transmitted from or received by an antenna (113) that is coupled to a subscriber terminal (104) or more specifically a data transceiver (102) including a controller (103). The data transceiver (102), described more fully below, operates to convert radio signals into data messages and vice a versa in addition to establishing and maintaining the radio communications link with the infrastructure (101). The data messages are supplied to or received from a computer (105), referred to here alternatively as a portable computing device, host, or host terminal, at interface (117). It should be noted that while FIG. 1 depicts only one radio channel, one modem, and one infrastructure antenna, a practical system may include a plurality of each, such as a different radio frequency channel. Generally the data communications system (100) is intended to supply specific messages to/from specific subscriber terminals in a largely transparent (to end users) fashion.

Figure 2:
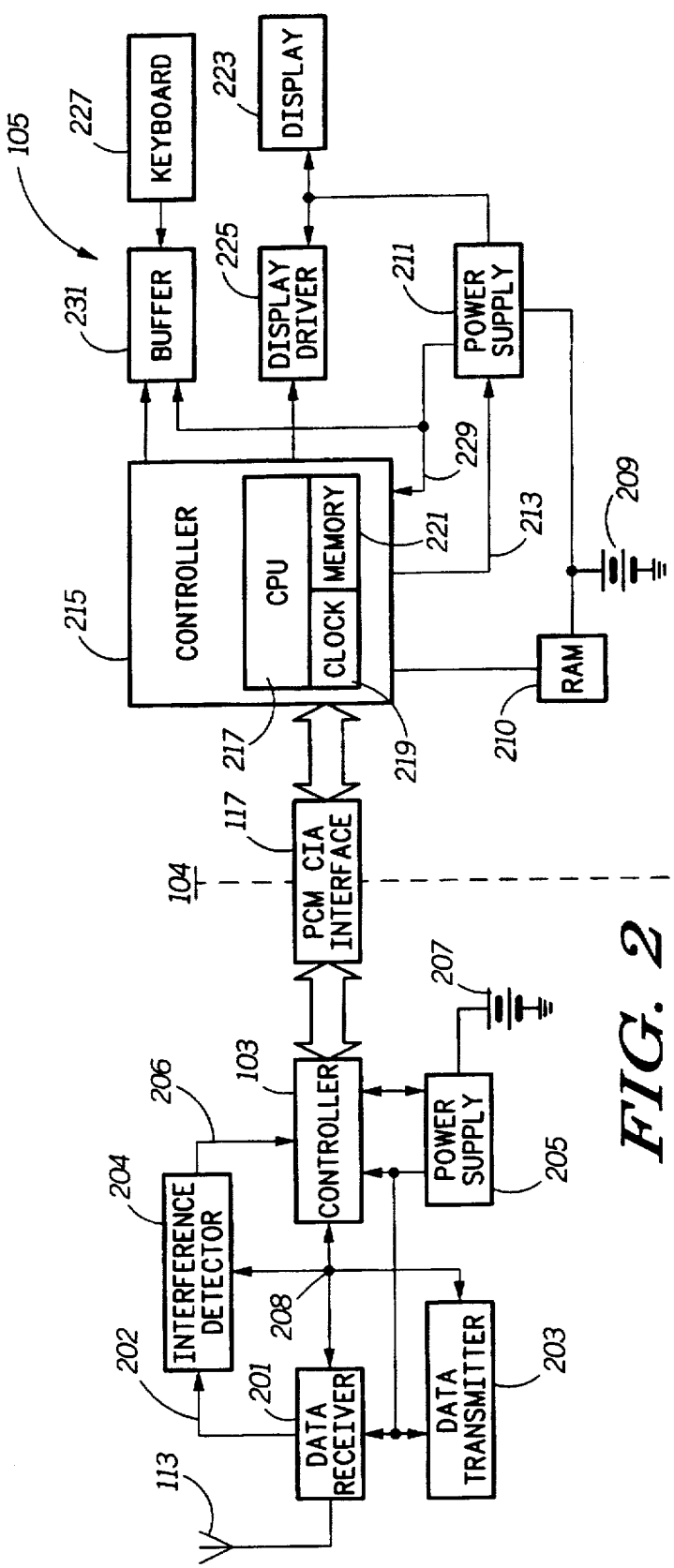
FIG. 2 is a block diagram of a subscriber terminal in accordance with the present invention.

Referring to the FIG. 2 block diagram of a subscriber terminal (104) wherein like reference numerals refer to like elements from FIG. 1, a more detailed description of the functions of the subscriber terminal will be undertaken. As depicted the subscriber terminal (104) includes the radio frequency transceiver (102) coupled to the computer (105), preferably, portable computing device at the interface (117). The interface (117) includes, preferably, an electrical interface, such as defined by the Personal Computer Memory Card International Association (PCMCIA) Card Interface Release 2.0 electrical standard, published by the Personal Computer Memory Card International Association, 1030B East Duane Avenue, Sunnyvale California Personal Computer Memory Card International Association, however any other general purpose interface will suffice.

The radio frequency transceiver includes a radio frequency receiver or data receiver (receiver) (201) and a transmitter or data transmitter (203) each coupled to the antenna (113) as well as controller (103) and a power supply (205). The receiver (201) or controller (103) further includes an interference detector (204) that is supplied with a received signal strength indication (RSSI) at path (202) and the recovered data signal at path (208) and operates to detect radio frequency interference to provide an interference indication to controller (103) at path (206).

The interference detector, preferably, implemented as part of the controller, compares the expected bit error rate (BER) for an indicated RSSI with an actual measured BER, preferably calculated or measured as an average of the actual number of bit errors observed in, for example, the synchronization patterns occurring within each data packet or message or any other known data pattern, and reports any differences as a relative level of interference in the form of the interference indication. More particularly, for a given RSSI and other system parameters such as modulation types or protocols an expected BER may be calculated or measured. When an actual BER is worse, higher, or poorer than the expected BER for a given indicated signal strength the difference may be attributed to some form of interference that detracts from or at least does not improve BER. Experimental results for radios or receivers operating in accordance with Motorola's Radio Data Link Access Protocol (RDLAP) have been shown to have approximately a $10^{-5}$ BER rate for an interference free channel at a signal level of $-110$ dBm and a $10^{-3}$ BER rate for a channel having essentially the same signal level but with some added interference.

Generally the receiver, under control of the controller (103) for purposes such as tuning to one or another radio channel, whether enabled, powered up, etc. receives radio frequency signals from the wireless channel (109) and converts these signals to digital information that is forwarded to the controller for decoding and overhead interpretation, etc. Similarly the transmitter, under control of the controller for similar functions, receives digital information from the controller (103) and creates a radio frequency signal with the requisite modulation that is subsequently transmitted on the radio channel (109).

The power supply (205), which may operate in a switching mode to produce the desired supply voltages for the radio frequency transceiver, is coupled to a battery (207), preferably a rechargeable battery such as a NICAD based unit, and provides power to the elements of the radio frequency transceiver again under control of the controller (103).

The controller (103) additionally handles communication between the transceiver (102) and the computer (105). Such communication may include delivering or receiving data messages or other informational and control messages, respectively, to and from the computer. Under certain circumstances, such as, where the controller (103) a. can anticipate radio frequency interference relying on operating state information provided by the computer (105) or alternatively b. is informed of such interference by the interference detector (204) the controller or alternatively the computer, when notified of the interference by the controller (103), may undertake corrective action at, respectively, the receiver or computer either blindly, as required, or as subsequently determined to be possible or required, thus advantageously avoiding the radio frequency interference.

The portable computing device or computer (105) includes a complementary portion of the interface (117), preferably PCMCIA interface, a battery (209), preferably rechargeable battery, and power supply (211) that operates in a switching mode to produce the desired supply voltages for the computer (105). The power supply (211) has a control input (213) allowing control of the power supply by a controller (215), such as a Motorola 68,000 series controller. Included within the controller (215) is a microprocessor (217) containing a real time clock (219), and memory (221) such as random access memory (RAM) and read only memory (ROM).

Further included in the computer is a display device (223), such as a liquid crystal display (LCD), for providing a visual user interface for viewing information such a E-mail messages, or stock quotes retrieved from the communications system through the radio frequency transceiver (102). A display driver (225) including a bias generator (hereafter display driver) provides control and switching circuits necessary for display of the viewed information and activating or enabling as well as deactivating or disabling the display.

A manual input module or keyboard (227) (e.g., a keyboard, trackball, slate, etc.) is provided for the input of control commands and data. In the illustrated embodiment, the input module is a keyboard (227). A buffer (231) or memory device is provided for buffering information from the keyboard (227). This information is provided to the controller (215) in accordance with a serial clock generated by the controller. During normal operation, the controller (215) monitors for inputs from the keyboard (227) and from the radio frequency transceiver (102) or more specifically the radio frequency transceiver's controller (103), such as data messages received by the data receiver (201) or various informational and control messages. In particular, in one embodiment the controller (215) supplies a signal including or corresponding to a operating state, such as computer active, display active, keyboard active, or power supply charging to the controller (103) and in another embodiment receives a message including the interference indication from the controller (103). In either case the receiving controller may take corrective action at their respective locations for their respective responsibilities to avoid interference or desensitization of the radio frequency receiver. The controller (215) also provides a display on the display device (223) of data and various user options.

The power supply (211), display driver (225), clock (219), and keyboard (227) elements discussed above and other peripheral devices such as a disk drive controller (not shown) are each potential sources of energy that may interfere with or desense or contribute to desensitization of the radio frequency transceiver (102) or more specifically receiver (201). These sources of interference or their effects, namely desensitization, may be advantageously eliminated or controlled using various embodiments of the instant invention.

When an operator (not shown) of the subscriber terminal (104) wishes to send or retrieve data (i.e., E-mail messages), the operator may for example select an appropriate option through the input module (227) and display device (223), as is well known in the art. In response, the controller (215) composes an appropriate data message and sends the message to the radio frequency transceiver's controller (103) where it is forwarded to the infrastructure in accordance with the system's protocol by way of the transmitter (203) and antenna (113).

After a delay (i.e., 5 seconds) the infrastructure ordinarily will respond with an acknowledgment of the message received. The subscriber terminal (104) identifies responses directed to itself by decoding each packet header of each data packet transmission transmitted by the infrastructure during the periods of time when it is active or receiving. Where an identifier within a received header matches an identifier of the subscriber unit, the remainder of the data packet is stored, decoded, or otherwise processed. Other messages, where an identifier does not match the subscriber unit's identifier, are ignored or discarded with the exception that the synchronization or other known patterns may be used by the interference detector for an actual BER measurement.

In accordance with certain embodiments of the invention, upon detecting radio frequency interference for the RF receiver (201) the controller (103) acts to provide an interference indication to the computer (105). The computer (105) thereafter and responsive thereto acts to reduce interfering noise or desensitization within the subscriber terminal and more particularly within the receiver (201) by causing deactivation of certain desense generating activities within the computer (105). Desense generating activities to be deactivated or disabled or other wise modified include some combination of the power supply (211), display driver (225), a serial clock, originating from within the controller (215), and used to shift data from the keyboard (227) into the controller (215), or the clock (219) or other switching devices that may generate desensitization.

Deactivation or disabling may take many forms but particularly must mitigate or reduce the generation of noise produced by or due to the portable computing device that would otherwise occur. This would include turning off the switching portion or charging portion of the power supply (211) for brief periods of time or until it became all important to turn it on. The display or keyboard could similarly be disabled for brief periods of time with little or no noticeable degradation to an end user. The basic controller clock (219) could be disabled or switched to a lower frequency operating mode if the computer were placed in a sleep or inactive mode of operation. For many data systems, such as those having power save protocols a given subscriber unit's radio frequency receiver will be active for something on the order of 10% or 12% of the time and in an inactive or sleep state for the balance of the time. In these systems typically controller (103) will be charged with determining this active time period and assuring that the receiver (201) is powered up and available to receive any messages during the active time period. By taking advantage of a power save protocol wherein the receiver (201) is enabled for around 10% of the time the computer (105) under a worst case scenario would still be fully operational for something approaching 90% of the time. Very often this implies that deactivation is little or no burden on a subscriber.

A detailed discussion and exemplary approach for taking corrective action(s) at the computer by deactivating various of the interfering noise sources is included within co-pending and concurrently filed patent application Ser. No. 08/366,359, which application is assigned to the same assignee and is hereby incorporated by reference into the instant one. A review of that disclosure is provided here.

Control of the charging power supply (211) by the controller (215) is accomplished after system boot-up by sequentially and repetitively checking the output (229) from the power supply to determine if charging is required. If charging is required, then the controller (215) activates the power supply via control lead (213). Once charging begins, the controller (215) tests to determine whether charging is complete. When the controller determines that charging is complete, the controller deactivates charging via control lead (213). If charging is not complete, the controller tests to see if deactivation is required to forego desense generating activities and if so deactivates the charging power supply (211) by for example, turning it off for the duration of an active time period.

Control of other peripheral devices (i.e., display (223), keyboard (227), etc. by the controller (215) is accomplished after system boot by first determining a set of threshold values for each peripheral. Threshold values for the peripherals may include such parameters as a maximum period of allowable deferred service and a maximum period since the last servicing of the peripheral. During normal operation the controller tests to see if servicing of a peripheral is required. If service is required, the controller begins to service the peripheral and further tests to see if deactivation is required to facilitate corrective action or forego desense generating activities and if so then the controller suspends service to the peripheral by deactivating switching devices, such as the display driver (225) or buffer (231) responsible for providing service to the peripheral.

If the peripheral device deactivated is the display (223), then the controller simply stops sending switching commands to the display driver. Since the image on the display (223) would begin to fade after 150–200 ms, the time of deactivation must be limited to a comparable time period. To prevent fading, the threshold values of maximum shutdown of the display would be set to 150–200 ms maximum deactivation time and 150–200 ms maximum time since last service cycle.

If the peripheral device to which service is interrupted is the keyboard (227), then the switching device deactivated is the serial clock. Without the serial clock, the deactivated peripheral device simply enters a wait state with varying effects.

In the case of the keyboard, delays of transmission of greater than 200 ms may produce noticeable delays in the response of the computer. If such delays are objectionable, the threshold values of maximum shutdown time, and time since last servicing, would be set to less than 200 ms, however longer delays are tolerable if a message is being received.

Following deactivation of switching devices of peripherals, the controller (215) compares a deactivation time of each peripheral against a corresponding threshold value. Where a deactivation period of a peripheral exceeds a threshold value, the controller may re-initiate service to that peripheral. Service to other peripherals that have not exceeded any appropriate threshold value will continue to be deferred.

Deactivation of devices may be staged based on necessity or need. Where service to a peripheral (power supply (211)) is perceived to be crucial, service may be maintained to that peripheral while service to other peripherals is interrupted. Where a battery (209) charge level is deemed critical other peripheral devices, such as the display (223) keyboard (227), etc., may be deactivated simultaneously or sequentially. Where sequential operation is chosen, the keyboard (227) may, for example, be deactivated first, followed by the display (223) and so on.

In certain embodiments the controller (103) is programmed to take corrective action responsive to either an interference indication resulting from whatever source including an extraneous source or an operating state indication from the computer (105). This corrective action may take many forms but exemplary approaches include merely delaying attempts at data communications for a prescribed time period or until the interference is no longer present, seeking to register the subscriber unit on a different radio frequency that may include registration on another data network, or alternatively modifying various transmission or data link attributes. In data communications a delay on the order of tens of seconds may not be objectionable to an end user. There is a fair chance, dependent on the characteristics of the computer (105) that the interference or desensitization experienced on one radio frequency will be different and possibly less on another radio frequency. The alternative corrective action either individually or collectively with the others attempts to increase the transport or communications reliability of the data link, by for example decreasing a data rate from 19.2 kilo bits per second (kbs) to 4.8 kbs, or adding additional forward error correction.

Figure 3:
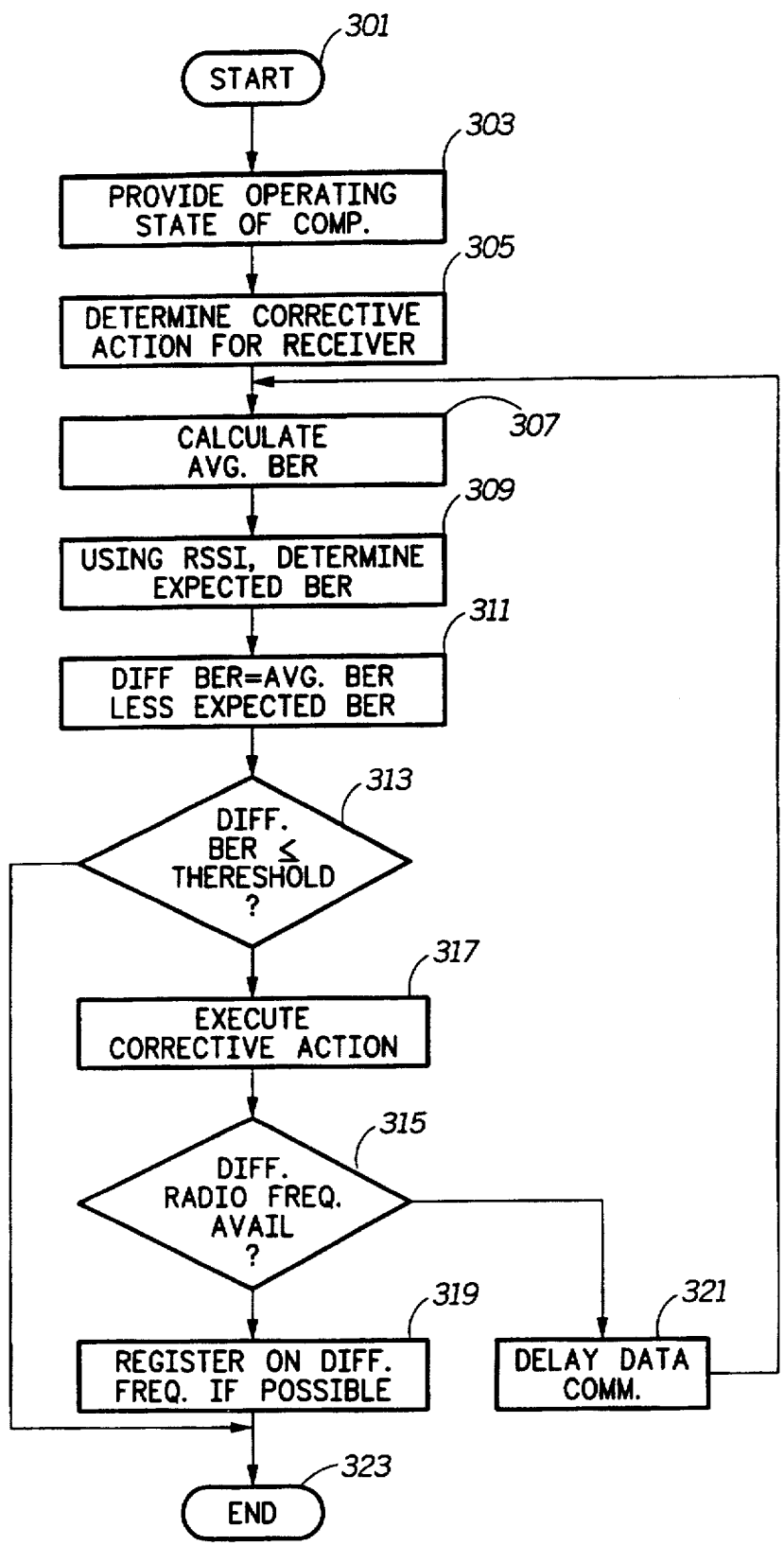
FIG. 3 is a preferred method embodiment in accordance with the instant invention.

Referring to FIG. 3, a preferred method embodiment in accordance with the instant invention will be described. Generally the FIG. 3 method is set in a subscriber terminal suitable for operation in or on a wireless communications system having an infrastructure and subscriber terminals. The wireless communications system is arranged and constructed to provide data communications between the infrastructure and the subscriber terminals. The subscriber terminals include a computer that is operatively coupled to a radio frequency (RF) receiver. The method provides a way of advantageously avoiding desensitization of the radio frequency receiver due, for example, to interfering noise generated by the computer or some extraneous source.

The method starts at step (301) and initially in certain embodiments provides an operating state for the computer (105) at step (303). This operating state may be expressly or affirmatively provided at the interface (117) or implicitly provided as experimentally determined so that in the presence of certain levels of interference it is presumed to be due to a certain operating state of the computer, such as when the computer is awake. Other embodiments, such as where the interference, determined as further explained below, is due to an extraneous source start at step (307). In any case, at step (305), responsive to the operating state when provided, a determination of the appropriate corrective action for the radio frequency receiver is made.

Steps (307-313) include a determination of whether and to what extent radio frequency interference is present by providing an interference indication, designated difference BER, at step (311). Initially an average observed BER is calculated at step (307). Then step (309) uses the observed RSSI and determines, by, for example, a look up table within the controller (103), a corresponding expected BER. Finally an interference indication, including a difference BER is formed from the average BER less the expected BER at step (311). Ultimately, using this interference indication or difference BER appropriate corrective action (step 317) may be determined and executed. Such corrective action, preferably, is conditioned on the interference indication satisfying a threshold and that is tested at step (313). If the difference BER is less than the threshold where the threshold is ½ of an order of magnitude then the "Y" path is followed to step (323) where the process ends. In other words any affirmative corrective action has been foregone.

However if the interference indication does not satisfy the threshold (difference BER is greater than the threshold) the "N" path is followed to step (315) where the radio frequency receiver tests for the availability of a different radio frequency. If available the subscriber unit attempts to register on the different frequency at step (319) and the process ends. If not available the subscriber unit delays data communication at step (321) and the process returns to step (307) and repeats thereby essentially delaying further data communications until the interference indication satisfies the threshold or until registration on a different frequency occurs. This process is further preferably augmented by an initial test of average BER, after step (307) and if that BER is sufficient no interference is present and no corrective action need be taken. As noted earlier a further step of modifying data link attributes such as data rates or forward error correction schemes may be implemented, preferably after a predetermined time delay at step (321).

Figure 4:
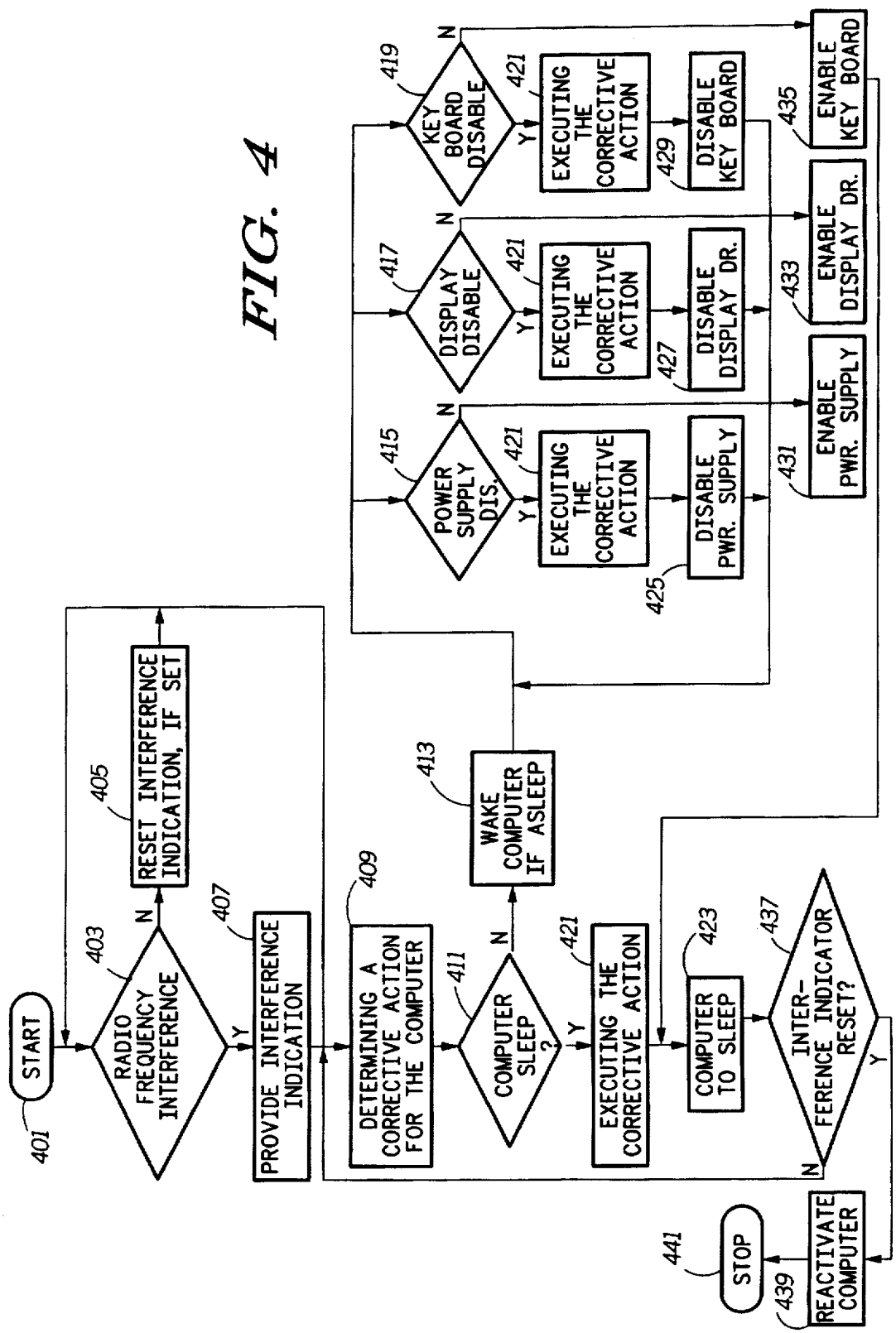
FIG. 4 is an alternative method embodiment in accordance with the instant invention.

Referring to FIG. 4 an alternative method embodiment in accordance with the instant invention will be described starting at process step (401). Step (403), determines whether radio frequency interference is present. This is accomplished, for example, using the process steps (307–313) described above with reference to FIG. 3. If such interference is present an interference indication is provided, by for example controller (103) at step (407) after which the process returns to step (403) and continues to test for the interference. If no such interference is present or is no longer present the interference indication, if set or provided, is reset at step (405) after the receiver (201) has completed it's expected activity and the process repeats starting at step (403).

If an interference indication has been provided, controller (215) seeks to determine a corrective action for the computer at step (409). Included within this determination, at step (411) is a test of whether the computer (105) may simply be put to sleep, as would be the case, for example, if no operator driven activity was present. If the computer (105) should not be sleeping or powered down and it has been, step (413) is directed to waking the computer up after which various possible sources of interference, specifically the power supply (211), the display driver (225), and the keyboard (419), are tested, respectively, at steps (415, 417, 419), to determine whether they can be disabled. This testing for each of these sources has been described above and it may further be noted that additional sources of interference can readily be similarly tested. In any event after determining the appropriate corrective action the process moves to step (421) where this action is executed thus eliminating or minimizing the interference due to such sources.

Step (421) includes among others step (423) where the computer is put to sleep after determining this is appropriate at step (411). Additionally each of the potential sources of interference that may be disabled as noted and determined above at steps (415, 417, 419) are so disabled at, respectively, steps (425, 427, 429) after which the process returns to steps (415, 417, 419) for continued testing. In the event that it is not, or no longer, appropriate to disable one or more of the sources, specifically power supply, display drivers, or keyboard the respective source(s) is enabled or reactivated at respectively steps (431, 433, 435). After either step (423, 431, 433, or 435), whether the interference indicator has been reset (see step (405)) is tested at step (437) and if not the process repeats from step (411). If the interference indicator has been reset, the computer (105) or any disabled constituent portions thereof is reactivated at step (439) and the method ends at (441).

It will be appreciated by those of ordinary skill in the art that the apparatus and methods disclosed provide various advantageous techniques of avoiding desensitization of a radio frequency receiver operating in conjunction with a computer as a subscriber terminal in a data communications system. Hence, the present invention, in furtherance of satisfying a long-felt and growing (given the proliferation of data systems and associated computer or computer like devices) need for improved approaches for avoiding desensitization problems without the alternative burden of providing excessive shielding systems that may be unduly large and expensive.

It will be apparent to those skilled in the art that the disclosed invention may be modified in numerous ways and may assume many embodiments other than the preferred form specifically set out and described above. Accordingly, it is intended by the appended claims to cover all modifications of the invention which fall within the true spirit and scope of the invention.

What is claimed is:

1. In a subscriber terminal suitable for operation on a wireless communications system that is arranged and constructed to provide data communications between an infrastructure and the subscriber terminal, the subscriber terminal including a computer operatively coupled to a radio frequency (RF) receiver, a method of avoiding desensitization of the radio frequency receiver by the computer including the steps of:

provided at least a wake operating state and a sleep operating state for the computer, where the wake and sleep operating states are mutually exclusive;

providing from the computer to the RF receiver an indication of the wake or sleep operating state:

determining, responsive to said operating state, a corrective action for the RF receiver; and executing said corrective action for said RF receiver when the indication shows that the computer is in the wake operating state.

2. The method of claim 1 wherein said step of executing a corrective action for said RF receiver includes a step of delaying a communication with the infrastructure in response to the computer providing to the RF receiver an indication that the computer is in the wake operating state.

3. The method of claim 2 wherein said step of determining includes a step of assessing an interference indication.

4. The method of claim 3 further including a step of comparing said interference indication to a threshold.

5. The method of claim 4 further including a step of foregoing said step of delaying when said threshold is satisfied.

6. The method of claim 1 wherein said step of executing a corrective action for said RF receiver includes attempting to establish communications on a different radio channel in response to the computer providing to the RF receiver an indication that the computer is in the wake operating state.

7. The method of claim 6 wherein said step of determining includes a step of assessing an interference indication.

8. The method of claim 7 further including a step of comparing said interference indication to a threshold.

9. The method of claim 8 further including a step of foregoing said step of attempting when said threshold is satisfied.

10. A subscriber terminal suitable for operation on a wireless communications system that is arranged and constructed to provide data communications between an infrastructure and the subscriber terminal, the subscriber terminal comprising in combination:

a portable computing device having mutually exclusive wake and sleep operating states arranged to provide at an interface a signal corresponding to a wake or sleep operating state; and a radio frequency receiver arranged to receive communications from the infrastructure and operatively coupled to said portable computing device via the interface, said radio frequency receiver, responsive to said signal, further executing a corrective action when said signal indicates a wake state, such that desensitization corresponding to said wake state is avoided.

11. The subscriber terminal of claim 10 wherein portable computing device further includes a controller for responding to said signal and providing control for said radio frequency receiver.

12. The subscriber terminal of claim 11 further including an interference detector, coupled to said controller, for providing an interference indication.

13. The subscriber terminal of claim 12 wherein said controller conditions said corrective action on said interference indication.

14. The subscriber terminal of claim 13 wherein said corrective action includes delaying a communication with the infrastructure when said signal indicates a wake state, until said signal indicates a sleep state.

15. The subscriber terminal of claim 13 wherein said corrective action includes attempting to establish communications on a different radio frequency.

16. In a subscriber terminal suitable for operation on a wireless communications system that is arranged and constructed to provide data communications between an infrastructure and the subscriber terminal, the subscriber terminal including a computer operatively coupled via an interface to a radio frequency (RF) receiver, a method of avoiding desensitization of the radio frequency receiver by the computer including the steps of:

detecting, at the RF receiver, a radio frequency interference that is associated by the RF receiver with an operating state of the computer, to provide an interference indication;

determining, responsive to said interference indication, a corrective action for the RF receiver; and executing said corrective action for the RF receiver, including providing a desense indication to the computer via the interface for causing the computer to reduce interfering noise.

17. The method of claim 16 wherein said step of executing a corrective action for said RF receiver includes a step of delaying a communication with the infrastructure.

18. The method of claim 17 wherein said step of determining includes a step of comparing said interference indication to a threshold.

19. The method of claim 18 further including a step of foregoing said step of delaying when said threshold is satisfied.

20. The method of claim 16 wherein said step of executing a corrective action for said RF receiver includes attempting to establish communications on a different radio frequency.

21. The method of claim 20 wherein said step of determining includes a step of comparing said interference indication to a threshold.

22. The method of claim 21 further including a step of foregoing said step of attempting when said threshold is satisfied.

23. A subscriber terminal suitable for operation on a wireless communications system that is arranged and constructed to provide data communications between an infrastructure and the subscriber terminal, the subscriber terminal comprising in combination:

a portable computing device operating in a operating state to provide a user interface; and a radio frequency receiver operatively coupled to said portable computing device via an interface said radio frequency receiver arranged to receive communications from the infrastructure, to detect a radio frequency interference that corresponds to said operating state, to execute a first corrective action that corresponds to said radio frequency interference, and to provide an indication of the radio frequency interference to the portable computing device via the interface;

wherein the portable computing device is operative to execute a second corrective action to avoid the radio frequency interference in response to the indication.

24. The subscriber terminal of claim 23 wherein said radio frequency receiver further includes a controller for providing control for said radio frequency receiver.

25. The subscriber terminal of claim 24 further including an interference detector, coupled to said controller, for detecting said radio frequency interference to provide an interference indication.

26. The subscriber terminal of claim 25 wherein said controller conditions said first corrective action on said interference indication.

27. The subscriber terminal of claim 26 wherein said first corrective action includes delaying a communication with the infrastructure.

28. The subscriber terminal of claim 26 wherein said first corrective action includes attempting to establish communications on a different radio frequency.

* * * * *